US010654998B2

(12) United States Patent
Batinas-Geurts et al.

(10) Patent No.: US 10,654,998 B2
(45) Date of Patent: May 19, 2020

(54) MOULDING COMPOSITION

(71) Applicant: SABIC GLOBAL TECHNOLOGIES B.V., Bergen op Zoom (NL)

(72) Inventors: Koen Batinas-Geurts, Geleen (NL); Rob Donners, Geleen (NL); Christelle Marie Hélène Grein, Heel (NL); Cor Bischoff, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 79 days.

(21) Appl. No.: 15/745,750

(22) PCT Filed: Jul. 11, 2016

(86) PCT No.: PCT/EP2016/066395
§ 371 (c)(1),
(2) Date: Jan. 18, 2018

(87) PCT Pub. No.: WO2017/012896
PCT Pub. Date: Jan. 26, 2017

(65) Prior Publication Data
US 2018/0208755 A1 Jul. 26, 2018

(30) Foreign Application Priority Data

Jul. 22, 2015 (EP) ..................... 15177937

(51) Int. Cl.
| | | |
|---|---|---|
| *C08L 23/14* | (2006.01) | |
| *C08L 23/10* | (2006.01) | |
| *C08L 51/06* | (2006.01) | |
| *C08K 3/013* | (2018.01) | |
| *B29C 45/00* | (2006.01) | |
| *B29C 45/40* | (2006.01) | |
| *B29C 45/72* | (2006.01) | |
| *B29K 23/00* | (2006.01) | |
| *B29K 105/00* | (2006.01) | |
| *B29K 105/16* | (2006.01) | |
| *B29K 509/00* | (2006.01) | |

(52) U.S. Cl.
CPC .......... *C08L 23/14* (2013.01); *B29C 45/0001* (2013.01); *B29C 45/0013* (2013.01); *B29C 45/40* (2013.01); *B29C 45/7207* (2013.01); *C08K 3/013* (2018.01); *C08L 23/10* (2013.01); *C08L 51/06* (2013.01); *B29K 2023/12* (2013.01); *B29K 2105/0005* (2013.01); *B29K 2105/16* (2013.01); *B29K 2509/00* (2013.01); *C08L 2205/025* (2013.01); *C08L 2205/035* (2013.01); *C08L 2205/06* (2013.01); *C08L 2207/02* (2013.01)

(58) Field of Classification Search
CPC ............... C08L 23/14; C08L 2205/025; C08L 2205/035; C08L 2207/02; C08L 2205/06; B29C 45/0001; B29C 45/7207; B29C 45/40; B29C 45/0013; B29K 2023/12
USPC .......................................................... 524/317
See application file for complete search history.

(56) References Cited

U.S. PATENT DOCUMENTS

| | | | | |
|---|---|---|---|---|
| 8,674,028 B2 * | 3/2014 | Van Riel | ............... | C08F 297/08 525/240 |
| 2005/0124734 A1 * | 6/2005 | Hucks | ................... | B01F 13/103 523/351 |
| 2013/0012608 A1 | 1/2013 | Van Riel et al. | | |
| 2014/0242335 A1 * | 8/2014 | Kondo | .................... | C08L 51/06 428/141 |
| 2015/0175790 A1 * | 6/2015 | Kim | ....................... | C08L 23/10 524/451 |

FOREIGN PATENT DOCUMENTS

| | | | |
|---|---|---|---|
| CN | 103772819 A | | 5/2014 |
| CN | 104086894 A | * | 10/2014 |
| CN | 104086894 A | | 10/2014 |
| EP | 2754691 A1 | | 7/2014 |
| GB | 2405874 A | | 3/2005 |
| JP | 2006124534 | * | 5/2006 |
| WO | 0031181 A1 | | 6/2000 |

OTHER PUBLICATIONS

Translation of JP2006-124534, May 18, 2006. (Year: 2006).*
Polybond 3200 datasheet, 2018. (Year: 2018).*
International Serach Report for International Application No. PCT/EP2016/066395; International Filing Date: Jul. 11, 2016; dated Aug. 16, 2016; 3 Pages.
Written Opinion of the International Searching Authority for International Application No. PCT/EP2016/066395; International Filing Date: Jul. 11, 2016; dated Aug. 16, 2016; 5 Pages.
Chinese Office Action for the corresponding Chinese Application No. 201680042895.2; dated Sep. 25, 2019; 13 pages.

* cited by examiner

*Primary Examiner* — Hui H Chin
(74) *Attorney, Agent, or Firm* — Cantor Colburn LLP

(57) ABSTRACT

The present invention relates to a moulding composition comprising polypropylene, inorganic filler and mould release composition, wherein the mould release composition comprises maleic anhydride modified polypropylene and glycol or glycerol ester of a fatty acid.

18 Claims, No Drawings

MOULDING COMPOSITION

CROSS REFERENCE TO RELATED APPLICATIONS

This application is a 371 of International Application No. PCT/EP2016/066395, filed Jul. 11, 2016, which claims priority to European Application No. 15177937.8 filed Jul. 22, 2015 which are incorporated herein by reference in their entirety.

The present invention relates to a moulding composition comprising polypropylene, inorganic filler and mould release composition.

Compositions comprising polypropylene and inorganic filler are very often used for the manufacture of articles by means of injection moulding processes. Such articles may be automotive interior and exterior articles like bumpers, side trims, step assists, body panels, spoilers, dashboards, interior trims and the like. Non-automotive applications include household and appliance articles like housings of vacuum cleaners, kitchen machinery, coffee machines, toys, hairdryers and the like.

In a typical injection moulding process molten thermoplastic composition is injected in a closed mould, followed by cooling the composition to below its melting temperature. Once the material is of low enough temperature the mould is opened allowing for the release of the so formed injection moulded article. Injection moulding is a very well known technique for making articles on the basis of thermoplastics.

In order to maintain an optimal production output it is essential that the freshly moulded articles can be released from the mould relatively easy and that the mould requires a low cleaning frequency. This is of particular importance in the automotive industry where the complex logistics require the availability of the car components to be on time without maintaining large stocks. In other words, especially in the automotive industry it is of high importance that manufacture of car parts is as efficient as possible and stoppage of the automotive assembly lines needs to be prevented. Accordingly it is common that so called mould release agents are added to the thermoplastic compositions that allow easy mould release and prevent the mould from having to be cleaned frequently.

In view of the foregoing it is therefore an object of the invention to provide a polypropylene composition having improved mould release properties.

To that extent the present inventors surprisingly found that the combination of a small amount of maleic anhydride modified polypropylene to known mould release agents being a glycol or glycerol ester of a fatty acid significantly improves the mould release properties. In particular the present inventors found that polypropylene compositions containing this combination of materials allowed for much easier release of the moulded product from the mould. Also the present inventors found that the cleaning frequency could be reduced.

Accordingly the present invention relates to a moulding composition comprising polypropylene, inorganic filler and mould release composition, wherein the mould release composition comprises maleic anhydride modified polypropylene and glycol or glycerol ester of a fatty acid.

By application of the invention the foregoing object is thus met.

For the avoidance of doubt the term "glycol or glycerol ester of a fatty acid" means a glycol ester of a fatty acid or a glycerol ester of a fatty acid".

The amount of mould release composition in a polypropylene composition is generally known to be relatively small. Accordingly in a preferred embodiment the amount of mould release composition is from 0.1-2.0 wt. %, preferably from 0.3 to 1.5 wt. % based on the weight of the moulding composition. Even further preferred amounts of mould release composition are from 0.5-1 wt. %.

The polypropylene for use in the composition according to the invention may be a propylene homopolymer, a propylene—α-olefin random copolymer, preferably a propylene ethylene or a propylene $C_4$-$C_8$ α-olefin random copolymer, a propylene—α-olefin block copolymer, or a heterophasic polypropylene copolymer comprising a matrix phase and a disperse phase, the matrix phase consisting of a propylene homopolymer and/or a propylene copolymer with up to 3 wt. % of ethylene and/or at least one $C_4$-$C_8$ α-olefin, the wt. % being based on the matrix phase, and the disperse phase consisting of an ethylene—$C_3$-$C_8$ α-olefin copolymer. The polypropylene can also be mixture of two or more types or two or more grades of the same type of these polypropylenes.

For automotive applications it is preferred that the polypropylene is one or more of a heterophasic polypropylene.

For the heterophasic propylene copolymer it is preferred that the matrix phase is a propylene homopolymer or a propylene—ethylene copolymer with up to 3 wt. % of ethylene and further that the disperse phase is an ethylene propylene copolymer with from 20-80 wt % of propylene and 80-20 wt. % of ethylene, the wt. % based on the disperse phase.

Preferably the melt flow rate of the polypropylene is from 0.1-100 g/10 min as measured in accordance with ISO 1133 (2.16 kg, 230° C.). More preferably the melt flow rate is from 5.0 to 80 g/10 min, even more preferably from 10-60 g/10 min or 20-60 g/10 min. Higher melt flow rates generally allow faster injection moulding cycle times.

The fatty acid is preferably saturated fatty acid. Fatty acids are generally known to be carboxylic acids with a relatively long aliphatic chain, which may be saturated or contain one or more unsaturations. However, the presence of unsaturations is not preferred as such unsaturations are more prone to undesired reactions that potentially deteriorate the properties of the polypropylene compound. The fatty acid preferably has a chain of from 4-28 carbon atoms. Examples of saturated fatty acids are caprylic acid, capric acid, lauric acid, myristic acid, palmittic acid, stearic acid, arachidic acid, behenic acid, lignoceric acid and cerotic acid. Examples of unsaturated fatty acids are erucic acid, oleic acid, arachidonic acid, linoleic acid, linolenic acid, myristoleic acid, palmitoleic acid, sapienic acid, elaidic acid and vaccenic acid.

It is preferred that the fatty acid is a long chain fatty acid, preferably a long chain saturated fatty acid with from 13-21 carbon atoms. Most preferably the fatty acid is stearic acid.

It is preferred that the ester is a glycerol mono ester, most preferred the ester is glycerol monostearate.

The amount of glycol or glycerol ester of a fatty acid is preferably from 0.05 to 1.5 wt. % based on the weight of the composition. More preferably the amount is from 0.1-1 wt. % even more preferably from 0.1-0.5 wt. % based on the weight of the composition.

The maleic anhydride modified polypropylene preferably contains from 0.1-3.0 wt. % of maleic anhydride functionalities, based on the weight of the maleic anhydride modified polypropylene. The amount of maleic anhydride is preferably from 0.3-2.0 wt. %, more preferably from 0.5-1.5 wt. %

Maleic anhydride modified polypropylenes are known in the art and for example available from ExxonMobil under the trade name Exxelor™ PO1015 and Exxelor™ PO1020.

Exxelor™ PO1015 is a propylene copolymer that was modified with maleic anhydride by means of reactive extrusion. It has a melt flow rate of about 150 g/10 min according to ISO 1133 (2.16 kg, 230° C.), a density of 0.900 g/cm$^3$ and an amount of maleic anhydride functionality of from 0.25-0.5 wt. %.

Exxelor™ PO1020 is a propylene homopolymer that was modified with maleic anhydride by means of reactive extrusion. It has a melt flow rate of about 430 g/10 min according to ISO 1133 (2.16 kg, 230° C.), a density of 0.900 g/cm$^3$ and an amount of maleic anhydride functionality of from 0.5-1.0 wt. %.

The amount of maleic anhydride modified polypropylene is preferably from 0.05-1.5 wt. % based on the weight of the composition. More preferably said amount is from 0.1-1 or 0.1-0.9 wt. %. Most preferred is an amount of from 0.1-0.4 wt. %. The present inventors surprisingly found that even small amounts of modified polypropylene give a big improvement in the mould release properties.

It is preferred that the maleic anhydride modified polypropylene is (semi) crystalline.

The inorganic filler is preferably selected from calcium carbonate, talc or mixture of calcium carbonate and talc. Talc is most preferred as talc will have a more significant effect on the stiffness of the polypropylene as compared to calcium carbonate. Any type of talc can be used, depending also on the intended application. For example high aspect ratio talc may be used where higher stiffness is required, whereas very fine talc, i.e. talc with a small particle size can be used if the impact properties of the moulding composition need to be retained. Obviously mixtures of more than one type of talc also should be considered as falling within the ambit of the present invention. For example a mixture of high aspect ratio talc and very fine talc may be used wherein the ratio of the different talcs can be used as a tool for tailoring the mechanical properties of the moulding composition. Commonly used talc materials are commercially available for example from Imerys under the brand names high aspect ratio HAR talc, Jetfine talc or Steamic talc.

The amount of inorganic filler, preferably talc, is preferably from 2-30 wt. %, more preferably from 5-20 wt. % based on the weight of the moulding composition. Such amounts are generally used in automotive applications.

In an embodiment the moulding composition further comprises one or more of an ethylene α-olefin copolymer elastomer, preferably in an amount from 5-30 wt. % based on the weight of the moulding composition. Elastomers, which for the purpose of the present invention also include plastomers, can be added to the moulding composition for increasing the toughness of the material, i.e. the impact properties of the moulding composition. Examples of such materials include Engage rubbers available from Dow Chemical Company.

The moulding composition according to the invention is based on polypropylene as the thermoplastic material. Hence the moulding composition can also be said to be a polypropylene moulding composition. In the moulding composition the amount of polypropylene is at least 40 wt. % more preferably at least 50 wt. % or at least 60 wt. % on the basis of the weight of the composition.

In a preferred embodiment the present invention is directed at a moulding composition comprising polypropylene, inorganic filler and mould release composition, wherein the mould release composition comprises maleic anhydride modified polypropylene and glycol or glycerol ester of a fatty acid, said composition comprising from 40-90 wt. % of polypropylene from 0.1-2 wt. % of mould release composition from 2-30 wt. % of inorganic filler from 5-30 wt. % of ethylene α-olefin copolymer elastomer, all wt. % on the basis of the weight of the moulding composition.

Preferred materials and ranges for the preferred embodiment are those as described herein for the individual components.

The skilled person will understand that the composition according to the invention may further comprise from 0.1-5 wt. %, on the basis of the composition, of one or more additives such as anti-oxidants, pigments, dyes, nucleating agents, light stabilisers such as hindered amine light stabilisers, UV stabilisers, heat stabilisers, acid scavengers, and the like. Obviously the additives may be a mixture of at least two of the foregoing additives. Such additives are known to the skilled person.

The additives may be present in an amount of up to 5 wt. %, such as from 0.1-4 wt. % or 0.3-3 wt. %. Generally the composition will contain from 0.1-1 wt. % of a stabilisation package based on the weight of the composition.

In another aspect the present invention relates to a moulded article comprising or consisting of the moulding composition according to the invention.

Preferably said moulded article is an automotive interior or exterior article.

In yet a further aspect the present invention relates to the use of a composition comprising maleic anhydride modified polypropylene and glycol or glycerol ester of fatty acid as mould release agent in a polypropylene composition. In accordance with the foregoing said polypropylene composition preferably further comprises an inorganic filler and optionally an elastomer.

In yet a further aspect the present invention relates to the use of a composition comprising maleic anhydride modified polypropylene and glycol or glycerol ester of fatty acid in a polypropylene composition for improving the mould release properties of said polypropylene composition.

In yet a further aspect the present invention relates to a method for the manufacture of a moulded article comprising injecting the composition according to the present invention in molten form into a closed mould, cooling the composition to below the melting temperature of the composition and opening the mould allowing the release of the so moulded product from said mould.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context.

The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

The invention will now be further illustrated by the following non-limiting examples.

The Table 1 below lists the materials that were used in the Examples.

| | |
|---|---|
| PP1 | SABIC PP 612MK10; Heterophasic propylene copolymer having a MFR of 33 g/10 min (ISO 1133, 2.16 kg, 230° C.). |
| PP2 | SABIC PP95610; Heterophasic propylene copolymer having a MFR of 5.5 g/10 min (ISO 1133, 2.16 kg, 230° C.). |
| Elastomer | Ethylene-octene copolymer elastomer having a melt flow rate of about 5 g/10 min (ISO 1133, 190° C.; 2.16 kg) and a density of about 870 kg/m³. |
| Filler | Talc HAR T84 of Luzenac having a median particle size d50 of 2 mm (sedigraph) and 11 mm (laser); a cutoff particle size d95 of 10 mm (sedigraph) and a specific surface area of 16 m2/g. |

-continued

| | |
|---|---|
| CMB1 | Color masterbatch based on a LDPE carrier |
| CMB2 | Color masterbatch based on a LDPE carrier |
| AO | Antioxidant Irganox B225 available from BASF |
| MR1 | Glycerol monostearate, commercially available from Croda under the trade name Atmer 129. |
| MR2 | Masterbatch of 50% propylene homopolymer and 50% of ultra high molecular weight siloxane polymer, commercially available from Dow Corning under the trade name MB50-001. |
| MR3 | Ethylene bis stearamide, commercially available from Croda under the trade name Crodamide EBSV. |
| PPMAN | Maleic anhydride modified polypropylene having a maleic anhydride content of about 0.5-1.0 wt. %, commercially available from ExxonMobil as Exxelor PO1020. |

MR1, MR2, MR3 are mould release agents.

On the basis of these materials the following compositions were prepared.

The mould release properties are indicated in a qualitative manner representing the general mould release quality based on inter alia the noise generated by removal from the mould of the injection moulded part, the ease of release of the injection moulded part from the mould and further the amount of time that the injection moulding process could be carried out without cleaning of the mould. The high improvement found for Example E1 meant that production could be carried out for at least 10 hours without interruption of the process for cleaning of the mould. The minor improvement of example CE4 meant that, with respect to the reference example, the mould release was easier initially, but that over time it got worse resulting in the need for cleaning of the mould. The indication "poor" means that the mould release was worse compared to the reference.

| | Ref. | CE1 | CE2 | CE3 | CE4 | E1 | CE5 | CE6 |
|---|---|---|---|---|---|---|---|---|
| PP1 | 60.5 | 60.5 | 60.5 | 59 | 60.5 | 60.3 | 60.4 | 60.5 |
| PP2 | 5 | 5 | 5 | 5 | 5 | 5 | 5 | 5 |
| Elastomer | 19 | 19 | 19 | 19 | 19 | 19 | 19 | 19 |
| Filler | 14 | 14 | 14 | 14 | 14 | 14 | 14 | 14 |
| CMB1 | 1 | 1 | 1 | | 1 | 1 | 1 | 1 |
| CMB2 | | | | 2.5 | | | | |
| AO | 0.2 | 0.2 | 0.2 | 0.2 | 0.2 | 0.2 | 0.2 | 0.2 |
| MR1 | 0.3 | 0.4 | 0.5 | 0.3 | | 0.3 | 0.3 | 0.2 |
| MR2 | | | | | 1 | | | |
| MR3 | | | | | | | 0.1 | 0.1 |
| PPMAN | | | | | | 0.2 | | |
| Mould release | Reference | No effect | No effect | Poor | Minor improvement | High improvement | Poor | Poor |

The invention claimed is:

1. A moulding composition comprising polypropylene, inorganic filler and mould release composition, wherein the mould release composition is from 0.1-2.0 wt. %, based on the weight of the moulding composition and comprises maleic anhydride modified polypropylene and glycol or glycerol ester of a fatty acid, wherein the inorganic filler is selected from calcium carbonate, talc or mixture of calcium carbonate and talc, and wherein the amount of maleic anhydride modified polypropylene is from 0.05-0.9 wt. % based on the weight of the moulding composition.

2. The composition of claim 1, wherein the fatty acid is saturated fatty acid.

3. The composition of claim 1, wherein the maleic anhydride modified polypropylene contains from 0.1 to 3.0 wt. % of maleic anhydride functionalities, based on the weight of the maleic anhydride modified polypropylene.

4. The composition of claim 1, wherein the amount of maleic anhydride modified polypropylene is from 0.1 to 0.4 wt. % based on the weight of the moulding composition.

5. The composition of claim 1, wherein the amount of glycol or glycerol ester of a fatty acid is from 0.05 to 1.5 wt. % based on the weight of the moulding composition.

6. The composition of claim 1, wherein the amount of inorganic filler is from 2-30 wt. %, based on the weight of the moulding composition.

7. The composition of claim 1, further comprising ethylene α-olefin copolymer elastomer.

8. The composition of claim 7, comprising
from 40-90 wt. % of polypropylene,
from 0.1-2 wt. % of mould release composition,
from 2-30 wt. % of inorganic filler, and
from 5-30 wt. % of an ethylene α-olefin copolymer elastomer.

9. A moulded article comprising or consisting of the moulding composition of claim 1.

10. The moulded article of claim 9, wherein said article is an automotive interior or exterior article.

11. A method for the manufacture of a moulded article comprising injecting the composition of claim 1, in molten form into a closed mould, cooling the composition to below the melting temperature of the composition and opening the mould allowing the release of the so moulded product from said mould.

12. The composition of claim 1, wherein the amount of mould release composition is 0.3 to 1.5 wt. %, based on the weight of the moulding composition.

13. The composition of claim 2, wherein the fatty acid is stearic acid.

14. The composition of claim 6, wherein the amount of inorganic filler is from 2-30 wt. %, based on the weight of the moulding composition, and wherein the filler comprises talc.

15. The composition of claim 6, wherein the amount of inorganic filler is from 5-20 wt. %, based on the weight of the moulding composition.

16. The composition of claim 1, wherein the fatty acid is stearic acid.

17. The composition of claim 1, wherein the inorganic filler comprises talc.

18. The composition of claim 7, wherein comprising
from 40-90 wt. % of the polypropylene,
from 0.1-2 wt. % of the mould release composition wherein the fatty acid is stearic acid,
from 2-30 wt. % talc, and
from 5-30 wt. % of the ethylene α-olefin copolymer elastomer.

* * * * *